(12) United States Patent
Katsurahira

(10) Patent No.: US 8,063,322 B2
(45) Date of Patent: Nov. 22, 2011

(54) POSITION INDICATOR AND COORDINATE INPUT DEVICE

(75) Inventor: Yuji Katsurahira, Kazo (JP)

(73) Assignee: Wacom Co., Ltd., Saitama-Ken (JP)

( * ) Notice: Subject to any disclaimer, the term of this patent is extended or adjusted under 35 U.S.C. 154(b) by 859 days.

(21) Appl. No.: 12/104,661

(22) Filed: Apr. 17, 2008

(65) Prior Publication Data

US 2008/0257613 A1   Oct. 23, 2008

(30) Foreign Application Priority Data

Apr. 19, 2007   (JP) ................... 2007-110710

(51) Int. Cl.
*G06F 3/041*   (2006.01)
(52) U.S. Cl. .............. 178/19.04; 178/19.01; 345/179
(58) Field of Classification Search .......... 345/156–184; 178/18.01–18.08, 19.01–19.04
See application file for complete search history.

(56) References Cited

U.S. PATENT DOCUMENTS

| | | | | |
|---|---|---|---|---|
| 5,206,785 A * | 4/1993 | Hukashima | ............... | 361/283.2 |
| 5,565,632 A * | 10/1996 | Ogawa | ............... | 73/862.69 |
| 5,699,084 A * | 12/1997 | Fukuzaki | ............... | 345/179 |
| 5,861,876 A * | 1/1999 | Nakayama | ............... | 345/179 |
| 5,898,427 A * | 4/1999 | Okamoto | ............... | 345/179 |
| 5,999,170 A * | 12/1999 | Ooura et al. | ............... | 345/179 |
| 6,104,388 A * | 8/2000 | Nagai et al. | ............... | 345/179 |
| 6,265,676 B1 * | 7/2001 | Zloter et al. | ............... | 178/19.01 |
| 6,486,875 B1 * | 11/2002 | O'Donnell, Jr. | ............... | 345/179 |
| 6,563,494 B1 * | 5/2003 | Eichstaedt et al. | ............... | 345/179 |
| 6,573,887 B1 * | 6/2003 | O'Donnell, Jr. | ............... | 345/179 |
| 6,629,847 B1 * | 10/2003 | Satoh | ............... | 434/409 |
| 6,686,910 B2 * | 2/2004 | O'Donnell, Jr. | ............... | 345/179 |
| 6,710,267 B2 * | 3/2004 | Natsuyama et al. | ............... | 178/19.04 |
| 6,727,439 B2 * | 4/2004 | Chao et al. | ............... | 178/19.01 |
| 6,744,426 B1 * | 6/2004 | Okamoto et al. | ............... | 345/179 |
| 6,778,167 B2 * | 8/2004 | Ohashi | ............... | 345/173 |
| 6,937,231 B2 * | 8/2005 | Fujitsuka et al. | ............... | 345/179 |

FOREIGN PATENT DOCUMENTS

| | | |
|---|---|---|
| JP | U05-023240 | 3/1993 |
| JP | 08-137603 | 5/1996 |
| JP | 08-227336 | 9/1996 |
| JP | 2005-267376 | 9/2005 |

* cited by examiner

*Primary Examiner* — Amare Mengistu
*Assistant Examiner* — Dmitriy Bolotin
(74) *Attorney, Agent, or Firm* — Berenato & White, LLC

(57) ABSTRACT

A position indicator is provided. The position indicator includes an external case, and a core having an indicating unit projecting outside of the case. The core is movably supported by the case. The core has a central axis extending along a lengthwise direction thereof. A guiding unit includes an inclined plane provided on one of the case and the core. An engaging unit is provided on the other one of the case and the core. The engaging unit is slidably engaged with the inclined plane such that the guiding unit guides movement of the core when external force is applied to the indicating unit of the core in a lateral direction with respect to the central axis of the core. A pressure detector is operably associated with the core for detecting pressure applied to the indicating unit based on the movement of the core with respect to the case via the guiding unit.

21 Claims, 7 Drawing Sheets

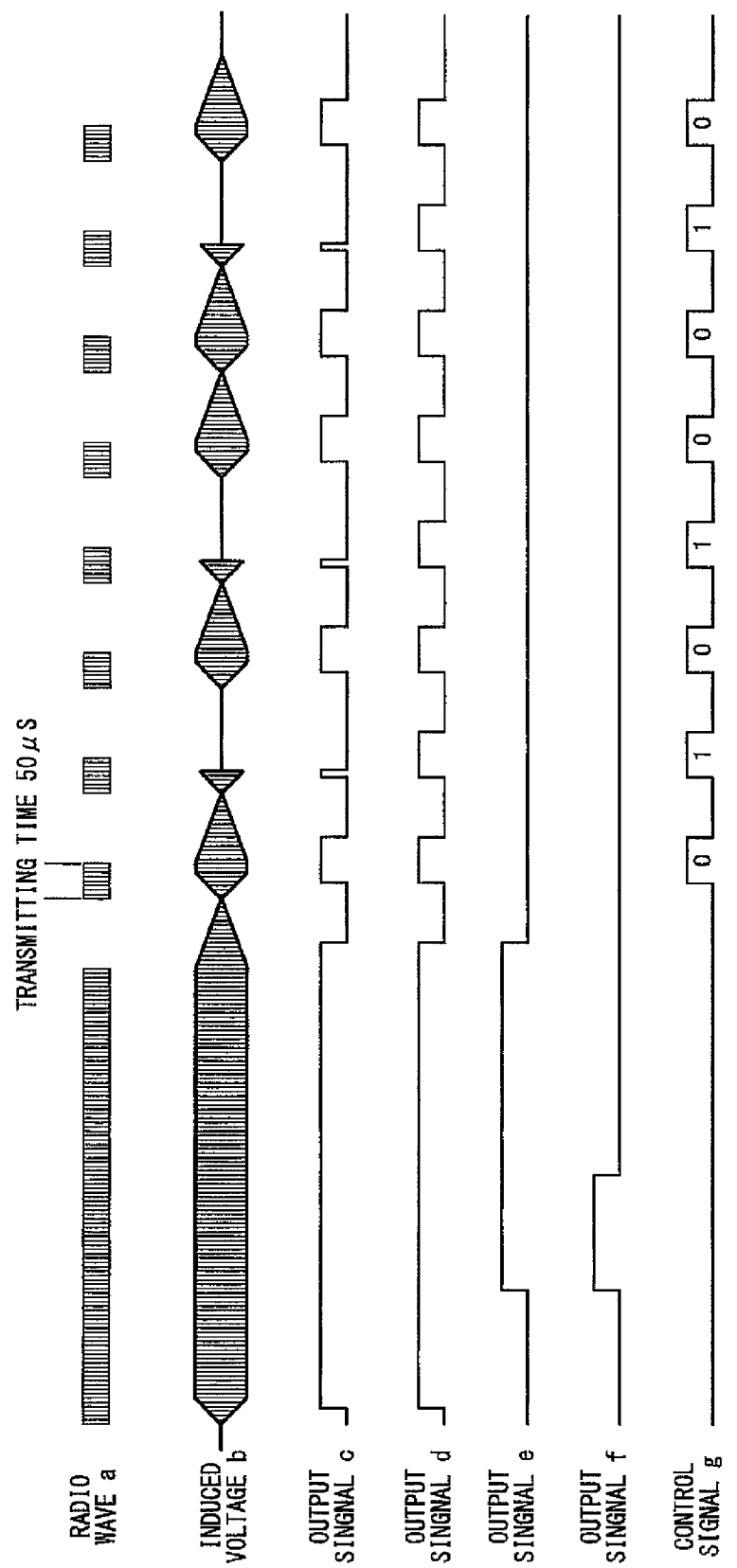

POSITION INDICATOR AND COORDINATE INPUT DEVICE

CROSS REFERENCE(S) TO RELATED APPLICATION(S) AND CLAIM TO PRIORITY

The present invention claims priority from Japanese Patent Application JP 2007-110710 filed in the Japanese Patent Office on Apr. 19, 2007, the contents of which are incorporated by reference herein and to which priority is claimed.

FIELD OF THE INVENTION

The present invention relates to a position indicator capable of detecting pen-pressure and a coordinate input device utilizing the position indicator.

BACKGROUND OF THE INVENTION

In recent years, personal computers have increasingly utilized coordinate input devices. A coordinate input device is typically configured to include a pen-shaped position indicator and a position detector. The position detector has an input plane via which a user can operate the position indicator to input characters or drawings by moving the position indicator along the input plane or pointing to specific locations on the coordinate input device. The position indicator includes a detecting unit for detecting pen-pressure against the input plane of the position detector when the user operates the position indicator on the coordinate input device.

An example of a conventional position indicator is disclosed in Japanese Unexamined Patent Application No. H04-96212. This document describes a position indicator having a variable capacitor with a capacitance value which varies with respect to the pressure applied to the position indicator. More specifically, the above-identified document discloses a variable capacitor including a dielectric, a first electrode attached on one surface of the dielectric, a second flexible electrode placed on the other surface of the dielectric, a spacing unit providing a space between the second electrode and the other surface of the dielectric, and a pressure or displacement applying unit applying a relative pressure or displacement between the second electrode and the dielectric. According to this document a position indicator includes a tuning circuit having the variable capacitor as part of a circuit element. The position indicator having the configuration disclosed in the publication continuously changes a tuning frequency of the tuning circuit according to the capacitance of the variable capacitor and transmits information on ON or OFF status of a switch to a tablet with subsequent operational information.

Another example of a position indicator is disclosed in Japanese Unexamined Patent Application No. H08-227336. The position indicator described in this document is a stylus pen capable of detecting pen-pressure, that is, a stylus pen having a pressure sensitive mechanism. The stylus pen includes a pen casing with an approximately cylindrical shape, a resonant circuit, and a pressure sensitive mechanism sensing the pen-pressure using a change in inductance generated by causing a relative displacement between a first magnetic body and a second magnetic body having a coil wound thereabout. The stylus pen further includes a pressing member having a contact unit receiving the pen-pressure and a rear end plane located approximately opposite to the contact unit. The rear end plane of the pressing member forms the first magnetic body. A second magnetic body has the coil wound thereabout such that a front end plane thereof is located a predetermined distance from the rear end plane of the pressing member. An elastic material member is arranged between the rear end plane of the pressing member and the front end plane of the second magnetic body. A first supporting unit is provided so as to hold the position of the second magnetic body against the pen-pressure applied via the pressing member and the elastic material member. A second supporting unit supports the pressing member in a non-parallel state when the rear end plane of the first magnetic body and the front end plane of the second magnetic body are not in parallel. The pen-pressure is detected by causing the first magnetic body to approach the second magnetic body to obtain a change in inductance of the coil wound around the second magnetic body. Subsequently, when the stylus pen is inclined against a position detecting plane, the pen-pressure is applied to the pressing member having the first magnetic body, the pressing member is inclined by the second supporting member, thereby causing one side of the first magnetic body to approach the second magnetic body. In this case, the pressing member is pushed so that at least the other surface of the first magnetic body is not separated from the second magnetic body. However, if the pen-pressure is applied to the pressing member in the lateral direction, the pressing member is not sufficiently pushed, and thus the pen-pressure cannot be detected accurately.

In general, writing tools such as pencils or brushes are used for calligraphy by inclining the writing tools and writing with the side surface of lead or brush. Specifically, the user writes with a pen or a brush in this manner to control the pressure applied thereto to express a subtle change in the thickness or density distribution of written lines. In recent years, there has been an increasing demand for a coordinate input device to simulate the aforementioned writing manner.

A position indicator disclosed in the Japanese Unexamined Patent Application Publication No. H04-96212 includes a pressing unit that presses a variable capacitor, which only moves in an axial direction thereof. Consequently, when the user operates the position indicator in an inclined manner with respect to an input plane of a tablet, pen-pressure may not be detected by the tablet. When the position indicator is allowed to contact the input plane of the tablet at right angles, the pen-pressure is applied in the axial direction of the pressing unit of the position indicator, and hence the pen-pressure can be accurately detected based on the displacement of the pressing unit. However, when the position indicator is inclined against the input plane of the tablet, and the pen-pressure is applied in the lateral direction of the pressing unit of the position indicator, the pressing unit of the position indicator is not moved in the axial direction. As a result, pen-pressure may not be detected.

SUMMARY OF THE INVENTION

The present invention provides a position indicator. The position indicator includes an external case and a core having an indicating unit projecting outside of the case. The core is movably supported by the case and has a central axis extending along a lengthwise direction thereof. A guide unit includes an inclined plane provided on one of the case and the core. An engaging unit is provided on the other one of the case and the core. The engaging unit is slidably engaged with the inclined plane such that the guide unit guides movement of the core when external force is applied to the indicating unit of the core in a lateral direction with respect to the central axis of the core. A pressure detector is operably associated with the core. The pressure detector detects pressure applied to the indicating unit based on movement of the core with respect to the case via the guide unit.

The present invention also provides a position detector having an input plane, a position indicator for indicating a position on the input plane and for detecting a force with which the position indicator is pressed against a surface. The position indicator includes an external case and a core having an indicating unit projecting outside of the case. The core has a central axis extending along a lengthwise direction thereof. The core is movably supported by the case. A guide unit includes an inclined plane formed on one of the case and the core. An engaging unit is provided on the other one of the case and the core. The engaging unit is slidably engaged with the inclined plane such that the guide unit guides movement of the core when external force is applied to the indicating unit of the core in a lateral direction with respect to the central axis of the core. A pressure detector is operably associated with the core. The pressure detector detects pressure applied to the indicating unit based on movement of the core with respect to the case via the guide unit.

The present invention also provides a position indicator usable with a coordinate input device. The indicator includes a housing having an inner surface defining an elongated cavity with at least one opening. The housing has a first central axis extending along the elongated cavity in a lengthwise direction. A core is movably disposed in the elongated cavity. The core has a first end positioned adjacent the at least one opening, a second end opposite the first end, and a second central axis extending along a lengthwise direction thereof. An indicating unit extends from the first end of the core via the at least one opening in the housing. The indicating unit is exposed outside the housing. A guiding unit is disposed between the inner surface of the housing and the core. The guiding unit guides movement of the core by translating a force applied to the indicating unit in a lateral direction with respect to the first central axis into axial movement along the second central axis of the core. A pressure sensor is disposed in the elongated cavity. The pressure sensor is engaged by the second end of the core for detecting pressure applied to the indicating unit based on the axial movement of the core.

The present invention also provides a coordinate input device. The coordinate input device includes a position detector having an input plane, and a position detecting unit with a plurality of sensing elements arranged in proximity with the input plane. A position indicator indicates a position on the input plane. The position indicator includes a housing, a pressure detector disposed in the housing, and a core movably disposed in the housing. The core has an indicating unit disposed at a first end thereof and a pressing unit disposed at a second end thereof for engaging the pressure detector so that the pressure detector detects the amount of pressure on the indicating unit. A guiding unit guides diagonal movement of the core in the housing when lateral force is applied to the indicating unit. The guiding unit maintains a central axis of the core parallel to a central axis of the housing when the lateral force is applied to the indicating unit. A coil is wound about the core. The coil is operable by the pressure detector for transmitting information to the position detector. The transmission information includes information about the amount of pressure on the indicating unit, information about a position of the position indicator with respect to the input plane, and information about an angle of inclination of the position indicator with respect to the input plane.

Accordingly, the embodiment(s) of the invention provide a position indicator and a coordinate input device that can detect an external force with high accuracy even when the position indicator is inclined against the coordinate input device so that an external force is applied to an indicating unit of the position indicator in a lateral direction.

BRIEF DESCRIPTION OF THE DRAWINGS

FIG. 3 is a waveform diagram illustrating operation of the position indicator shown in FIG. 2.

FIG. 4A is a diagram illustrating the position indicator being operated by inclination against on an input plane of a position detector, and FIG. 4B is a diagram illustrating the position indicator being operated by applying pressure on the input plane of the position detector in a lateral direction.

DESCRIPTION OF THE EMBODIMENT(S)

Figure 1:
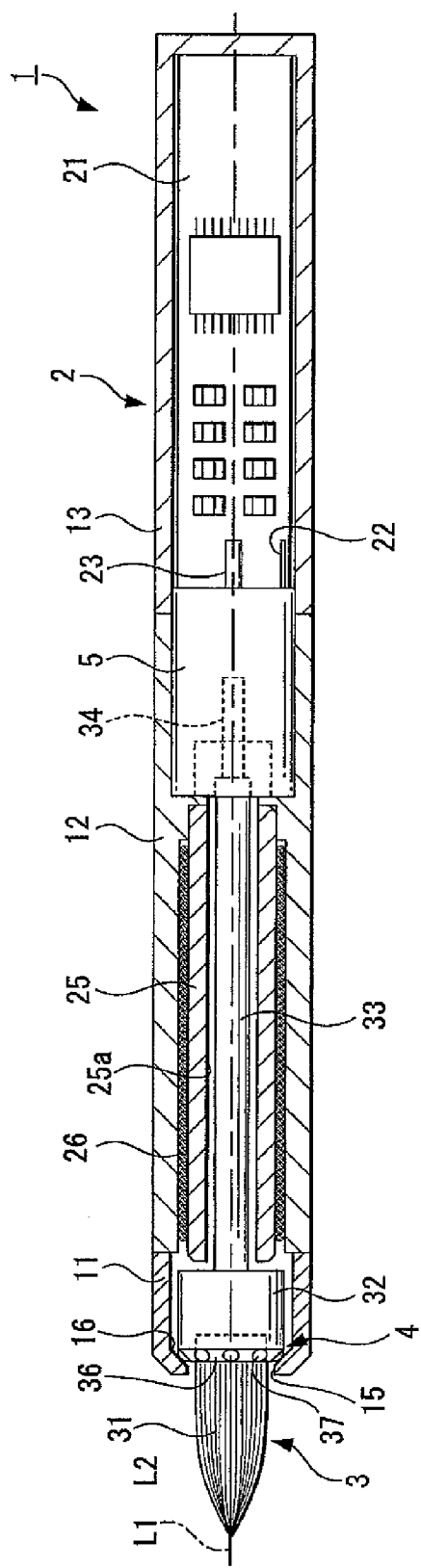
FIG. 1 is a sectional view illustrating a position indicator according to an embodiment of the present invention.

Reference will now be made in detail to the embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification.

Figure 2:
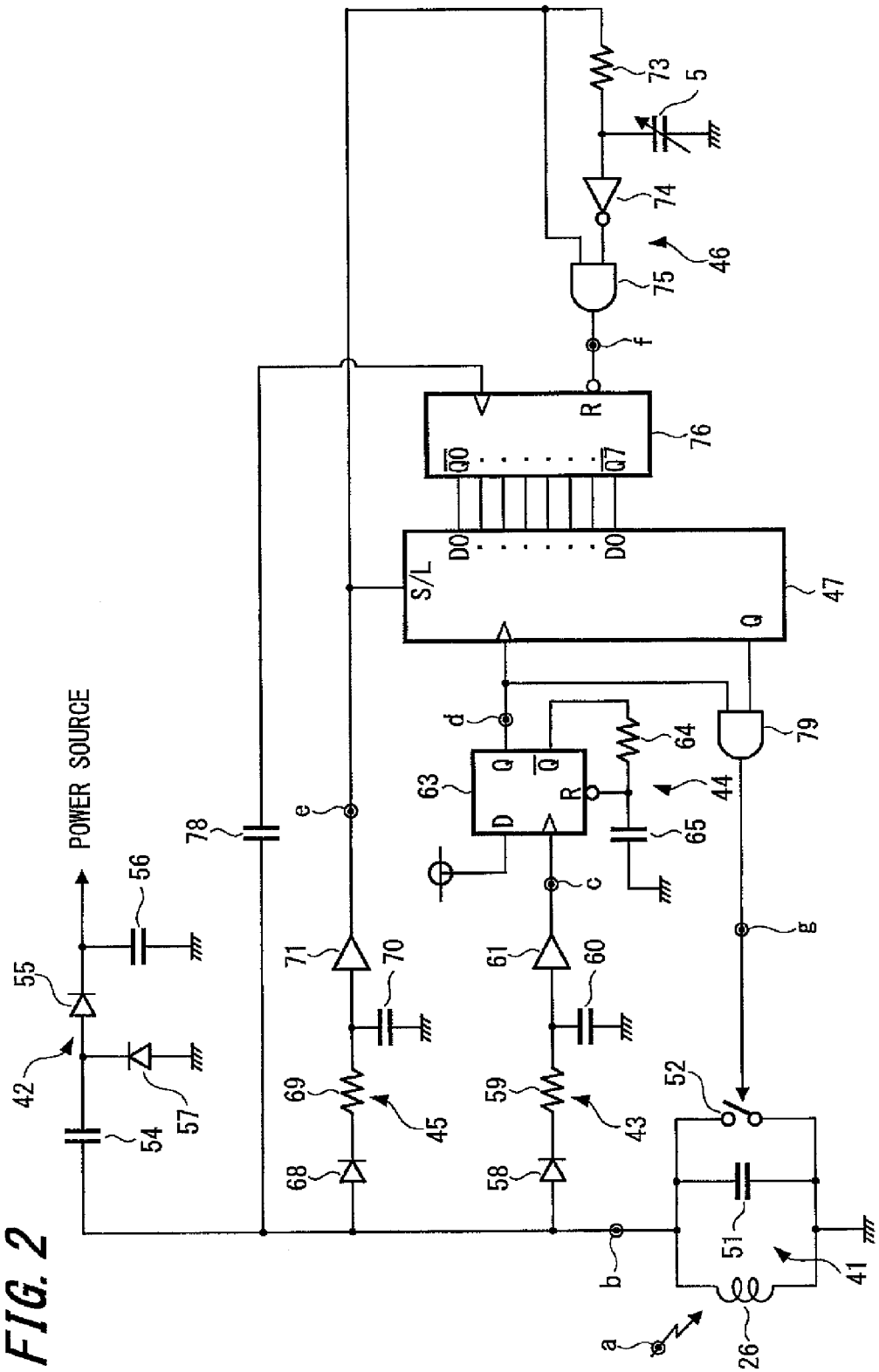
FIG. 2 is a circuit diagram of the position indicator shown in FIG. 1.

As best shown in FIGS. 1 to 4, a position indicator 1 is configured to indicate position on a position detector 102 (see FIG. 8) via electromagnetic induction. As best shown in FIG. 2, the position indicator 1 includes a resonant circuit 41 configured to resonate with an electromagnetic wave having a specific frequency transmitted from the position detector 102, and to transmit a resonance signal back to the position detector 102 in response to the received electromagnetic wave, thereby indicating position to the position detector 102 (see FIG. 8).

As best shown in FIG. 1, the indicator 1 includes an external case 2, a core 3 having an indicating unit 31 projecting from the case 2 and being movably supported in the case 2. A guiding unit 4 guides movement of the core 3 when an external force is laterally applied to the indicating unit 31 of the core 3, and a variable capacitance 5 that detects pressure applied to the core 3, which is guided by the guiding unit 4. It should be understood that the case 2 may have other shapes and/or configurations without departing from the spirit and scope of the present invention. Additionally, while the variable capacitance 5 is described as the pressure detector, it will be appreciated by one of ordinary skill in the art that other pressure sensing mechanisms can be used with the present invention.

The case 2 of the position indicator 1 is a generally cylindrical body, one end of which is closed. The case 2 includes a front-end case 11, a middle case 12, and a rear-end case 13, all of which are arranged along an axial direction into one unit.

The front-end case 11 has an opening 15 opposite to where the middle case 12 is located. A case side conical plane 16 is provided along an internal surface of the front-end case 11. The case side conical plane 16 is an inclined plane, which is part of the guiding unit 4. Other embodiments of the inclined plane will be described below.

The case side conical plane 16 is continuously formed from the opening 15 in the front-end case 11, and is formed with an inclination so that an internal space of the front-end case 11 is gradually enlarged away from the opening 15. An inclination angle of the case side conical plane 16 is about 45 degrees from a central axis L1 of the case 2. The core 3 of the position indicator 1 has central axis L2 extending along a lengthwise direction thereof. The central axis L2 of the core 3 is located to coincide with the central axis L1 of the case 2 when the position indicator 1 is not in operation. A spherical projection 37 of the core 3 is slidably engaged with the case side conical plane 16. The case side conical plane 16 may be mirror-finished so as to decrease the friction resistance between the case side conical plane 16 and the spherical projection 37. Alternatively, other mechanisms may also be used to reduce friction between the case side conical plane 16 and the spherical projection 37.

A polyacetal resin (POM) having a relatively small friction coefficient and providing excellent slidability may be employed as a material for the front-end case 11 having the case side conical plane 16. Alternatively, other synthetic resins, such as a polycarbonate (PC) and acrylonitrile butadiene styrene resin (ABS), can also be employed as the material for the front-end case 11 having the case side conical plane 16. Although the inclined plane, which is part of the guiding unit 4, is configured to correspond to the conical plane 16, it should be understood that a pyramidal plane may alternatively be used as the inclined plane, instead of the conical plane 16.

A printed circuit board 21 having electronic components is fixed on the rear-end case 13 with a fastening mechanism, such as an adhesive or fastening screws. The middle case 12 includes the variable capacitor 5 fixed thereto at a rear side thereof, adjacent to the rear-end case 12. The middle case 12 also includes a ferrite core 25 fixed thereto at a front side thereof, adjacent to the front-end case 11.

The variable capacitor 5 can vary a capacitance value according to the pressure applied thereto. The variable capacitor 5 is positioned so as to face a pressing unit 34 of the core 3 with a small space or gap therebetween when the position indicator 1 is not in operation. The distance between the variable capacitor 5 and the pressing unit 34 may be approximately 0.1 mm. The variable capacitor 5 includes two terminals 22 and 23 that are connected to the printed circuit board 21. Components of the printed circuit board 21 are electrically coupled with the variable capacitor 5 via the terminals 22 and 23.

The ferrite core 25 is formed of a cylindrical body. A cylindrical bore 25a of the ferrite core 25 includes a shaft 33 of the core 3 passing therethrough. A coil 26 is wound around the circumference of the ferrite core 25. Both ends of the coil 26 (not shown) are electrically coupled with components on the printed circuit board 21.

The core 3 is formed of an elongated member having the central axis L2. The core 3 includes the indicating unit 31 as a pen point, a supporting unit 32 supporting the indicating unit 31, the shaft 33 extending from the supporting unit 32 through the ferrite core 25 toward the variable capacitor 5, and a pressing unit 34 disposed at the end of the shaft 33 adjacent to the variable capacitor 5. The indicating unit 31 of the core 3 externally projects through the opening 15 of the case 2.

The indicating unit 31 is formed in a shape of a calligraphy-brush and is made up of a combination of extra-fine nylon fiber and synthetic elastomer resin. The user can input characters or graphics by operating the position indicator 1 while experiencing the feeling of writing with the calligraphy-brush. An example of the indicating unit 31 may include an FX type of the nylon fiber nibs manufactured by AuBEX Corp.

The supporting unit 32 of the core 3 is housed in the front-end case 11. The supporting unit 32 is formed in an approximately cylindrical shape, and a core side conical plane 36 is formed at the indicating unit 31 side of the supporting unit 32. The core side conical plane 36 is formed such that an inclination angle thereof is about 45 degrees from the central axis L2 of the core 3. The core side conical plane 36 includes the spherical projections 37 as an engaging unit, which is part of the guiding unit 4. The core side conical plane 36 may include eight spherical projections 37. Alternatively, other numbers of spherical projections can be used.

The spherical projections 37 are arranged at equal intervals along the core side conical plane 36, and are in point contact with the case side conical plane 16 when the position indicator 1 is not in operation. The surfaces of the spherical projections 37 may be mirror-finished so as to decrease the friction resistance between the case side conical plane 16 of the front-end case 11 and the spherical projections 37.

A polyacetal resin (POM) having a relatively small friction coefficient and excellent slidability may be employed as a material for the supporting unit 32 having the spherical projections 37. However, other synthetic resins, such as a polycarbonate (PC) and acrylonitrile butadiene styrene resin (ABS), can also be employed as the material for the supporting unit 32 having spherical projections 37.

The pressing unit 34 and shaft 33 of the core 3 are housed in the middle case 12. The shaft 33 has a cylindrical body with a diameter that is smaller than that of the supporting unit 32. The shaft 33 passes through the cylindrical bore 25a of the ferrite core 25, which is fixed in the middle case 12. The pressing unit 34 has a cylindrical body with a diameter that is less than that of the shaft 33. The pressing unit 34 faces the variable capacitor 5 with a small space or gap of approximately 0.1 mm therebetween. It will be appreciated by one of ordinary skill in the art that the dimension of the small space/gap can be varied based on a desired capacitance and/or the desired range of motion of the core 3 with respect to the case 2 and variable capacitor 5.

The core 3 is constantly biased outwardly by a biasing unit (not shown) in a direction of the opening 15 of the case 2 so as to be movably and relatively supported to the case 2. The biasing unit may be a spring or other elastic mechanism. When pressure is applied externally against the core 3, the core 3 is moved in the direction of the variable capacitor 5 against the biasing force generated by the biasing unit so that the variable capacitor 5 is pressed by the pressing unit 34 of the core 3.

FIG. 2 illustrates an exemplary circuit diagram of the position indicator 1 shown in FIG. 1, and FIG. 3 depicts a waveform obtained at each part of the circuit diagram indicated by points (a) to (g) in FIG. 2. It should be noted that some of the reference numbers used in FIG. 2 are used to refer to the same components shown in FIG. 1. In FIG. 2, components other than the variable capacitor 5 and the coil 26 are mounted on the printed circuit board 21 shown in FIG. 1. In this circuit the pressure value (pen-pressure) applied to the variable capacitor 5 is converted into an 8 bit-digital value and is transmitted to the position detector 102 (see FIG. 8) via the resonant coil 41.

The position indicator 1 includes the resonant circuit 41, a power source circuit 42, a first detecting circuit 43, a one-shot mono/multi circuit 44, a second detecting circuit 45, a pen-pressure detecting circuit 46, and a parallel-to-serial converting circuit 47.

The resonant circuit 41 includes the coil 26 and a capacitor 51. The resonant circuit 41 resonates with a frequency of the electromagnetic wave (a) supplied from the position detector 102 (see FIG. 8) to generate induced voltage (b). The resonant circuit 41 is connected with a switch 52. The switch 52 is supplied with a control signal (g) to control resonance of the resonant circuit 41. The resonant circuit 41 is connected with the power source circuit 42, and also with the first and second detecting circuits 43 and 45.

The power source circuit 42 includes a capacitor 54 extracting power from the induced voltage (b) generated by the resonant circuit 41, diodes 55 and 57, and a capacitor 56 utilized as an accumulator. The voltage accumulated in the capacitor 56 is supplied as a power source to the components of the circuit such as the first detecting circuit 43, second detecting circuit 45, etc.

The first detecting circuit 43 provides an output signal (c) to the one-shot mono/multi circuit 44. The first detecting circuit 43 includes a diode 58, a resistor 59, a capacitor 60, and a buffer amplifier 61. The first detecting circuit 43 is an integrating circuit with a time constant determined by the resistor 59 and the capacitor 60. The first detecting circuit 43 outputs the output signal (c) if the transmission period for the electromagnetic wave supplied from the position detector 102 (see FIG. 8) exceeds a first predetermined amount of time of 50 μS.

The one-shot mono/multi circuit 44 includes a D flip-flop 63, a resistor 64, and a capacitor 65. The one-shot mono/multi circuit 44 generates an output signal (d) with a predetermined duration from the rise time of the output signal (c) supplied from the first detecting circuit 43. The output signal (d) generated by the one-shot mono/multi circuit 44 is supplied to the parallel-to-serial converting circuit 47.

The second detecting circuit 45 provides an output signal (e) to the parallel-to-serial converting circuit 47. The second detecting circuit 45 includes a diode 68, a resistor 69, a capacitor 70, and a buffer amplifier 71 similar to the first detecting circuit 43. The second detecting circuit 45 is an integrating circuit having a time constant that is determined by the resistor 69 and the capacitor 70. The time constant is configured such that the second detecting circuit 45 outputs the output signal (e) if the transmission period for the electromagnetic wave supplied from the position detector 102 (see FIG. 8) exceeds a second predetermined amount of time of 200 μS.

The pen-pressure detecting circuit 46 includes a resistor 73, the variable capacitor 5, an inverting amplifier 74, an AND gate 75, and a counter 76. The pen-pressure detecting circuit 46 generates an output signal (f) having a pulse width that can be varied according to the pressure (pen-pressure) applied to the variable capacitor 5. Specifically, the pulse width of the output signal (f) increases in proportion to the pressure applied to the variable capacitor 5. The output signal (f) is supplied to the counter 76.

A clock terminal of the counter 76 is coupled to the resonant circuit 41 via a capacitor 78. The counter 76 counts the number of waves of high frequency signals generated at the resonant circuit 41 that occur during the pulse width of the output signal (f), which varies with the pen-pressure applied.

The counter 76 outputs the resulting number of counted waves to the parallel-to-serial converting circuit 47 as 8-bit digital values Q0 to Q7. The counter 76 outputs "0" for all the digital values Q0 to Q7 in a resetting state, i.e., when the output signal (f) is at the low in level. The counter 76 increments one value whenever the clock is input thereafter. In addition, when the clock is input 255 times, the counter 76 outputs "1" for all the digital values Q0 to Q7, and the counter 76 will not increment the values any more thereafter.

The clock input signal terminal of the parallel-to-serial converting circuit 47 is connected with the one-shot mono/multi circuit 44, which outputs an output signal (d). The parallel-to-serial converting circuit 47 sequentially outputs signals that are converted from the parallel 8-bit digital values Q0 to Q7 supplied by the counter 76 for each rise time of the output signal (d). The converted signals are processed as a control signal (g) by allowing them to pass through an AND gate 79 while the output signal (d) is generated.

The control signal (g) is output to the switch 52 and the switch 52 is switched on and off based on the control signal (g). The 8-bit data digitized from the pen-pressure is expressed as the presence or absence of signals generated by the resonant circuit 41 of the position indicator 1. Specifically, when the control signal (g) is "0", the switch 52 is open and the resonant circuit 41 generates a signal, which is then detected by the position detector 102 (see FIG. 8). On the other hand, when the control signal (g) is "1", the switch 52 is closed and the resonant circuit 41 generates no signal, and thus the position detector 102 will not detect a signal. In this manner, the position detector 102 (see FIG. 8) detects the pressure applied to the variable capacitor 5 of the position indicator 1 as the pen-pressure.

Figure 4A:
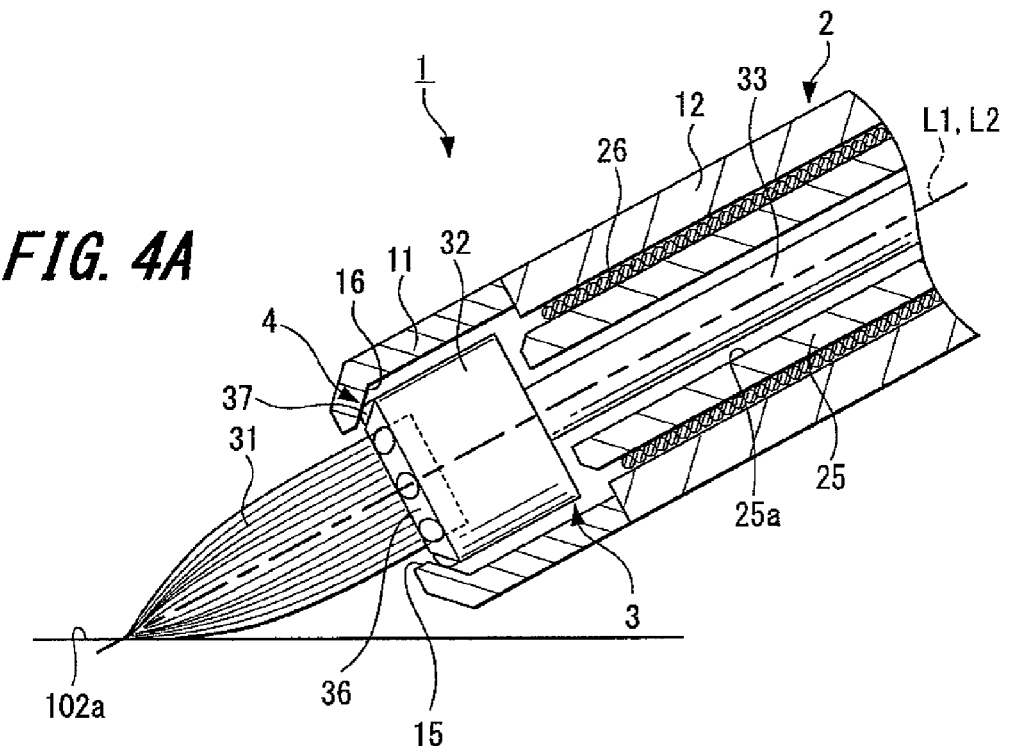
FIGS. 4A and 4B illustrate the position indicator shown in FIG. 1 during operation.

The movement of the core 3 when the position indicator 1 is placed on an input plane 102a of the position detector 102 with inclination will be described with reference to FIGS. 4A and 4B. The position indicator 1 in FIG. 4A illustrates a state in which the indicating unit 31 is not pressed against the input plane 102a, while the core 3 is biased outwardly from the opening 15 in the case 2 by the biasing unit (not shown).

Figure 4B:
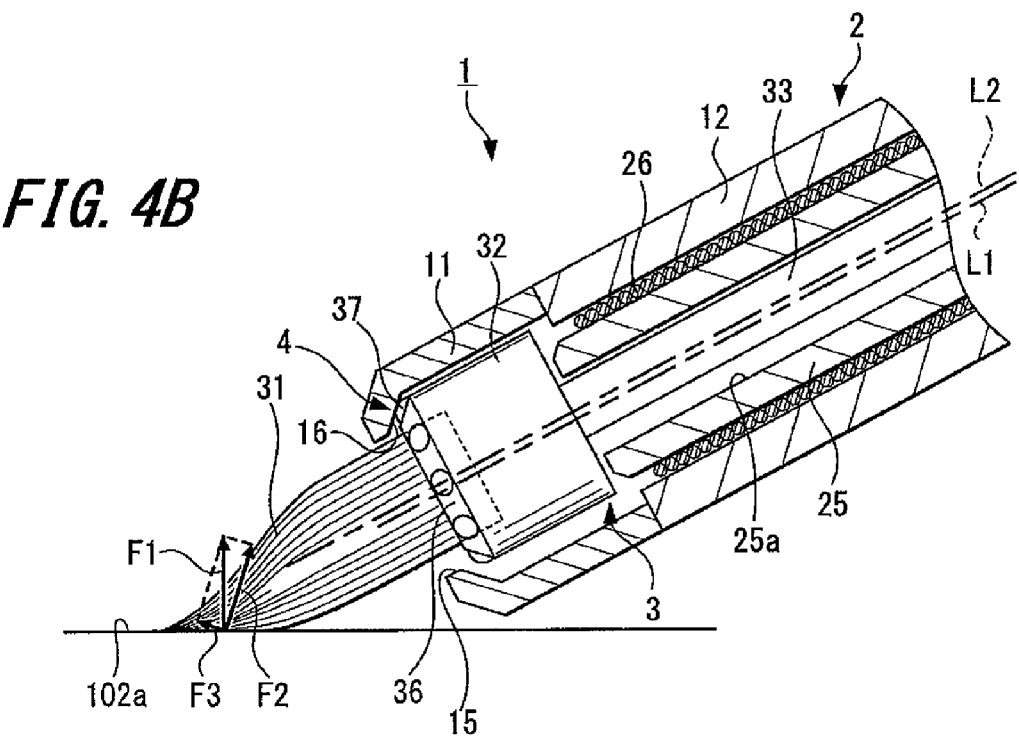

FIG. 4B illustrates a state in which the indicating unit 31 is pressed against the input plane 102a of the position detector 102. The indicating unit 31 is elastically deformed such that the indicating unit 31 is flexibly deflected while pressing against the input plane 102a. The external force applied to the indicating unit 31 is greater in the lateral direction than in the axial direction L2 of the core 3. When the external force is applied to the indicating unit 31 in the lateral direction, the spherical projections 37 of the core 3 are slidably moved on the case side conical plane 16 of the front-end case 11, thereby causing the core 3 to move relative to the case 2 against the biasing force applied by the biasing unit (not shown).

Specifically, the external force F1 applied to the indicating unit 31 is divided into two components of force: a first component of force F2 applied parallel to the inclined direction of the case side conical plane 16; and a second component of force F3 applied perpendicular to the inclined direction of the case side conical plane 16. The core 3 is moved relative to the case 2 according to the first component of force F2. Since the front-end case 11 and supporting unit 32 are made of a synthetic resin material having excellent slidability and the case side conical surface 16 and spherical projections 37 may be mirror-finished, the frictional resistance between the case side conical surface 16 and spherical projections 37 is minimized and the amount of the component of force F2 lost due to frictional resistance is also minimized. The core 3 is thus moved relative to the case 2 with high accuracy according to the component of force F2.

Since the core 3 is moved inwardly relative to the case 2, the core 3 is moved in the direction of the variable capacitor 5. Thus, the pressing unit 34 of the core 3 presses the variable capacitor 5 so that the pen-pressure can be detected with high accuracy. In this case, the core 3 moves diagonally as a 45 degree angle with respect to the central axis L1 of the case 2, and hence the distance that the core 3 is diagonally displaced is very short as compared to the length of the core 3 in the axial direction L2. Thus, the pressure applied to the variable capacitor 5 by the pressing unit 34 of the core 3 acts approximately parallel to the axial direction L2 of the core 3.

When the user operates the position indicator 1 orthogonal to the input plane 102a of the position detector 102 (see FIG. 8), the core 3 is forced to move in the axial direction against the biasing force applied by the biasing unit (not shown). Thus, the pressing unit 34 of the core 3 pushes the variable capacitor 5 so that the pen-pressure can be detected with high accuracy.

In the present embodiment of the invention, eight spherical projections 37 may be provided with the supporting unit 32 of the core 3; however, the number of spherical projections 37 provided as engaging units may be varied. Preferably, the number of spherical projections 37 may be at least three. In this case, three or more spherical projections 37 are provided at equal intervals on the core side conical plane 36 of the supporting unit 32. In this manner, at least one spherical projection 37 can be slidably moved on the case side conical plane 16 of the case 2 even when the position indicator 1 is operated at an incline in any direction. Additionally, the core 3 can be guided to the side of the variable capacitor 5.

Moreover, although the spherical projections 37 are described above as being provided on the core side conical plane 36 of the supporting unit 32, it should be understood that the spherical projections 37 may alternatively be provided on the case side conical plane 16 of the front-end case 11. In this case, since the spherical projections 37 are provided on the front-end case 11, the core side conical plane 36 formed on the supporting unit 32 of the core 3 corresponds to an inclined plane, which is part of the guiding unit.

Additionally, although the spherical projections 37 are described as being the engaging units, on the core side conical plane 36 of the supporting unit 32, it should be understood that projections of other shapes, such as cones or pyramids, may be formed such that the projections are in point-contact with the case side conical plane 16 of the case 2. Alternatively, an engaging inclined plane can instead be slidably engaged with the inclined plane as the engaging units. Specifically, an engaging conical plane that can slidably be engaged with the case side conical plane 16 of the front-end case 11 may be formed on the supporting unit 32 without the spherical projections 37 in-between. In this case, the engaging conical plane provided on the supporting unit 32 is slidably moved planar contact with the case side conical plane 16, and hence the core 3 is moved relative to the case 2.

Figure 5:
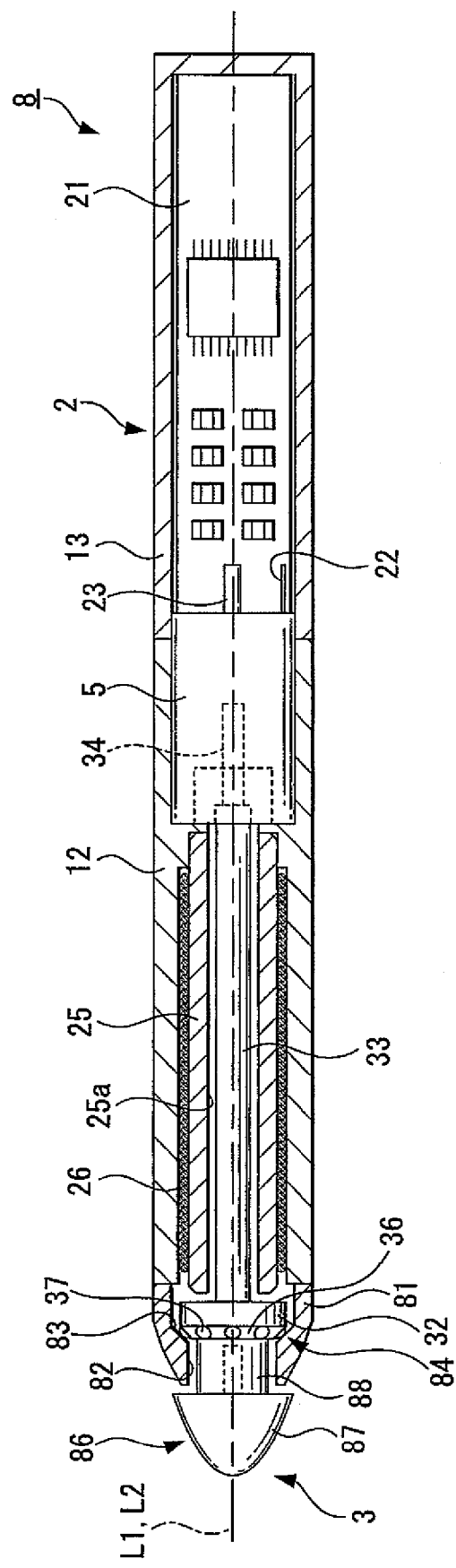
FIG. 5 is a sectional view illustrating a position indicator according to another embodiment of the present invention.

FIG. 5 illustrates a position indicator according to another embodiment of the invention. The position indicator 8 is configured to indicate positions on the position detector 102 (see FIG. 8) via electromagnetic induction in the same manner as the position indicator 1 of the previous embodiment. The position indicator 8 differs from the position indicator 1 shown in FIG. 1 in a front-end case 81 of the case 2 and an indicating unit 86 of the core 3. Thus, the following description will focus on aspects of the front-end case 81 and indicating unit 86 of the position indicator 8, and redundant description will be omitted. The same reference numerals will be used to refer to elements that are the same as those of the position indicator 1.

The front-end case 81 has an opening 82 opposite to where the middle case 12 is located. A fixing piece 88 of the indicating unit 86 extends through the opening 82 of the front-end case 81. A case side conical plane 83 is an inclined plane formed in the front-end case 81. The case side conical plane 83 extends continuously inward from the opening 82. The case side conical plane 83 is formed with an inclination so that an internal space of the front-end case 81 is gradually enlarged. An incline angle of the case side conical plane 83 is about 45 degrees with respect to the central axis L1 of the case 2. The central axis L2 of the core 3 of the position indicator 8 is located to coincide with the central axis L1 of the case 2 when the position indicator 8 is not in operation.

The case side conical plane 83 of the front-end case 81 is slidably engaged with spherical projections 37 provided on the supporting unit 32 of the core 3. As in the previous embodiment, there may be eight spherical projections 37. Alternatively, other numbers of spherical projections 37 may be used. A guiding unit 84 guides the core 3 to the variable capacitor 5. The guiding unit 84 includes the case side conical plane 83 and the spherical projections 37. The case side conical plane 83 may be smoothly finished, e.g., by mirror finishing, thereby decreasing the friction resistance between the case side conical plane 83 and the spherical projections 37. A polyacetal resin (POM) having a small friction coefficient and excellent slidability may be employed as a material for the front-end case 81 having the case side conical plane 83.

The indicating unit 86 of the core 3 includes an abutting piece 87 to abut on the input plane 102a of the position detector 102 (see FIG. 8) during operation. The fixing piece 88 extends from the abutting piece 87 and is fixed to the supporting unit 32. The abutting piece 87 of the indicating unit 86 is formed in an approximately conical shape having a rounded edge. A polyacetal resin (POM) or fluorocarbon resin having a small friction coefficient and excellent slidability may be employed as the material for the indicating unit 36 and/or the supporting unit 32. Of course, other synthetic resins such as a polycarbonate (PC) and an acrylonitrile butadiene styrene resin (ABS) may also be employed as the material for the indicating unit 36 and/or the supporting unit 32.

When the position indicator 8 is operated while being inclined on the input plane of the position detector 102 (see FIG. 8), the pressure (pen-pressure) is applied to the indicating unit 86 thereof in the lateral direction. When the pen-pressure is applied to the indicating unit 86 in the lateral direction, the spherical projections 37 of the core 3 are slidably moved along the case side conical plane 83 of the front-end case 81, thereby causing the core 3 to move relative to the case 2. That is, the core 3 moves against an outward biasing force applied by a biasing unit (not shown). As a result, the pressing unit 34 of the core 3 pushes against the variable capacitor 5 so that the pen-pressure can be detected with high accuracy.

The case 2 moves relative to the core 3 along the inclined direction inclined with respect to the axial direction L1 of the case 2. Because the angle of inclination of the case side conical plane 82 and the core side conical plane 36 is about 45 degrees from the axial direction L1 of the case 2, the core 3 moves along a 45 degree angle. However, since the core 3 is only slightly displaced in the inclined direction relative to the length of the core 3 in the axial direction thereof L2, the pressure is applied to the variable capacitor 5 by the pressing unit 34 along a direction approximately parallel to the axial direction of the core 3.

When the user operates the position indicator 8 orthogonal to the input plane 102a of the position detector 102 (see FIG.

8), the core 3 is forced to move in the axial direction L2 thereof against the outward biasing force applied by the biasing unit (not shown), thereby causing the pressing unit 34 to press the variable capacitor 5. Consequently, when the user operates the position indicator 8 orthogonal to the input plane 102a of the position detector 102, the pen-pressure may be detected with accuracy.

Figure 6:
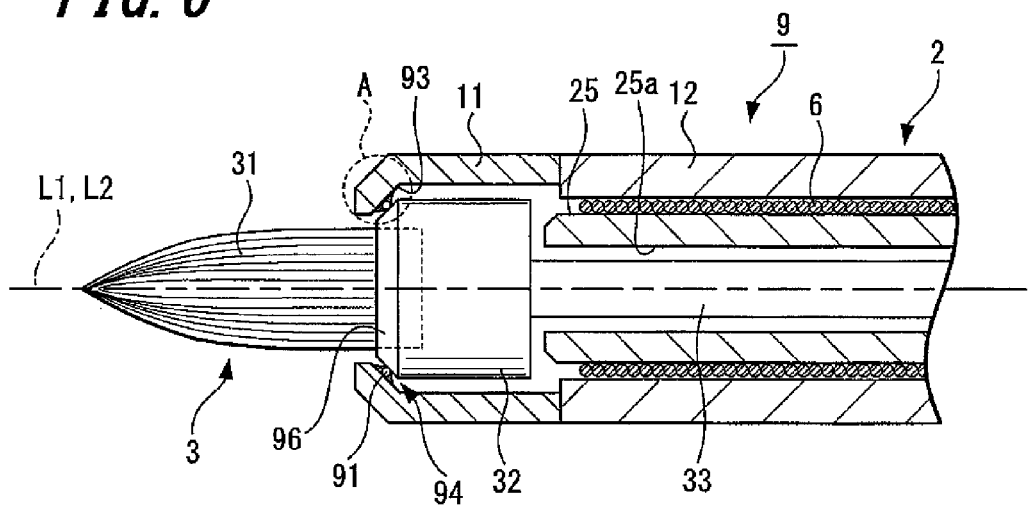
FIG. 6 is a diagram illustrating a position indicator according to yet another embodiment of the invention.
Figure 7:
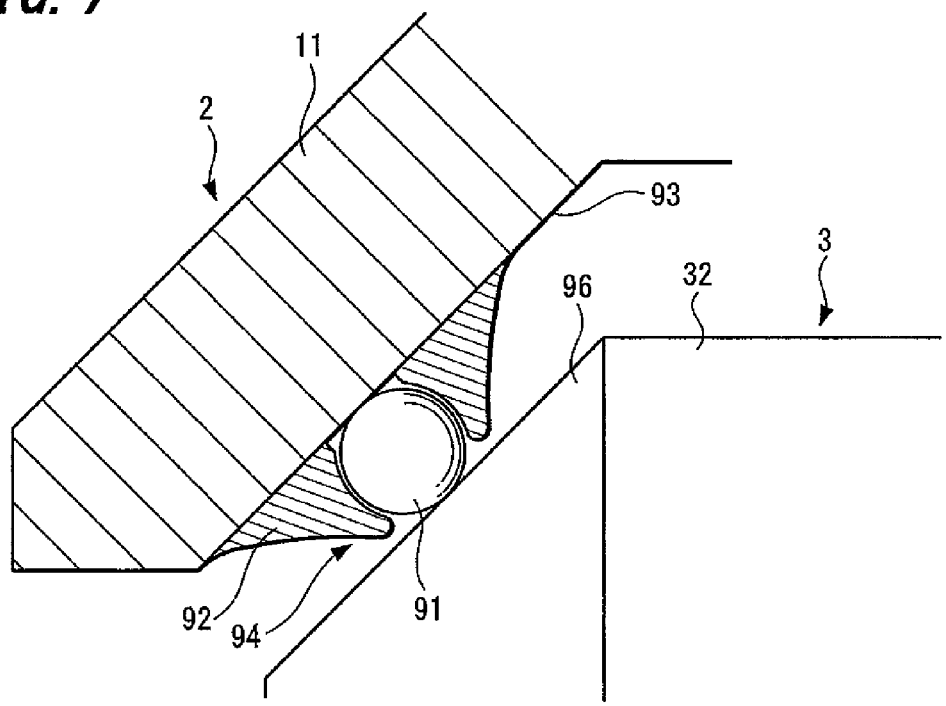
FIG. 7 is an exploded fragmentary sectional diagram illustrating a guiding unit of the position indicator in FIG. 6.

FIG. 6 illustrates a position indicator 9 according to yet another embodiment of the invention. The position indicator 9 is similar to the position indicator 1 shown in FIG. 1, as indicated by similar reference numbers. FIG. 7 is an enlarged diagram of the position indicator 9 shown in FIG. 6, centered around portion A, which is denoted by a circular dashed line in FIG. 6. The position indicator 9 of this embodiment is configured to indicate positions to the position detector via electromagnetic induction in the same manner as the position indicator 1 shown in FIG. 1. The position indicator 9 is different from the position indicator 1 shown in FIG. 1 with respect to a guiding unit 94 that guides the core 3 to the variable capacitor 5. Thus, the following description will focus on the guiding unit 94 without providing redundant description of elements described above in other embodiments.

As best shown in FIGS. 6 and 7, the guiding unit 94 of the position indicator 9 includes spherical members 91 as engaging units rotatably supported on the front-end case 11, and a core side conical plane 96 as an inclined plane provided on the supporting unit 32 of the core 3. The spherical members 91 may be three or more in number, or preferably, eight in number.

The spherical members 91 of the guiding unit 94 are rotatably supported by spherical member supporting units 92, respectively, which are provided on the front-end case 11. The spherical member supporting units 92 are provided on a case side conical plane 93 formed on an inner surface of the front-end case 11. The spherical members 91 are arranged at equal intervals along the case side conical plane 93 of the front-end case 11. The spherical members 91 are supported in point contact with the case side conical plane 93. The inclined angle of the case side conical plane 93 is approximately 45 degrees from the central axis L1 of the case 2. The central axis L2 of the core 3 of the position indicator 9 is located to coincide with the central axis L1 of the case 2 when the position indicator 9 is not in operation.

It is preferable that a material for the spherical member 91 has high strength, such as ceramics or stainless steel. However, the material for the spherical member 91 is not limited to ceramics or stainless steel and it will be understood that other materials such as structural carbon steel or engineered plastics may alternatively be used.

The core side conical plane 96 is formed on the side of the indicating unit 31, and the inclined angle thereof is approximately 45 degrees with respect to the central axis L2 of the core 3. The spherical members 91 are rotatably arranged in contact with the case side conical plane 93 of the case 2. The case side conical plane 93 and the core side conical plane 96 are smoothly finished, e.g., by mirror finishing, thereby decreasing the friction resistance between the case side conical plane 93 and the spherical members 91.

When the position indicator 9 is operated while being inclined against the input plane 102a of the position detector 102 (see FIG. 8), the pressure (pen-pressure) is applied to the indicating unit 31 thereof in the lateral direction. When the pen-pressure is applied to the indicating unit 31 in the lateral direction, the spherical members 91 arranged between the case side conical plane 93 and the core side conical plane 96 rotate, thereby causing the core 3 and the case 2 to move relative to one another against the biasing force that is applied by the biasing unit (not shown). Thus, the pressing unit 34 of the core 3 pushes the variable capacitor 5 so that the pen-pressure can be detected with high accuracy.

The spherical member supporting units 92 support the spherical members 91. The spherical members 91 are provided at equal intervals on the case side conical plane 93 of the front-end case 11. In this manner, at least one spherical member 91 is rotated between the case side conical plane 93 and the core side conical plane 96 regardless of incline direction of the position indicator 9. Accordingly, the core 3 can be guided to the variable capacitor 5.

Moreover, although the spherical member supporting units 92 supporting the spherical members 91 are described as being rotatably provided on the case side conical plane 93 of the front-end case 11, it should be understood that the spherical member supporting units 92 may alternatively be provided on the core side conical plane 96 of the supporting unit 32. In this case, since the spherical members 91 are supported on the case 3 as the engaging units, and the case side conical plane 93 corresponds to an inclined plane, inclined at preferably between 30 degrees and 60 degrees, of the guiding unit.

According to various embodiments of the present invention, an inclined plane, which is part of the guiding unit, is configured to correspond to the conical plane; however, it should be understood that a pyramidal plane may alternatively be configured to correspond to the inclined plane. Further, the inclined plane may be inclined with respect to the central axes L1 or L2 of the case 2 or core 3, respectively. In this case, it may be preferable to operate the position indicator when it is inclined in the predetermined direction so that the position indicator is inclined on the input plane of the position detector and the core 3 is guided to the variable capacitor 5. Therefore, it may be preferable to provide operational buttons or print on an outer surface of the case 2 instructing the user to operate the position indicator at an incline in the predetermined direction.

According to various embodiments of the present invention, the inclined angle of the case side conical plane 16, 83, 93 and the core side inclined plane 36, 96 of the guiding unit form a 45 degree angle with respect to the central axis L2 of the core 3. Accordingly, the component of the force F2 that is parallel to the planes 16, 83 can efficiently be obtained from the external force F1, as shown in FIG. 4B. However, it should be understood that the angle of the inclined plane(s) is not intended to be limited to 45 degrees from the central axis L2 of the core 3. Other angles may alternatively be used for the inclined plane. It is preferable that the angle of the inclined plane(s) be in the range of 30 to 60 degrees from the central axis L2 of the core 3 in order to obtain the component of the force F2 from the external force F1 with high efficiency.

Figure 8:
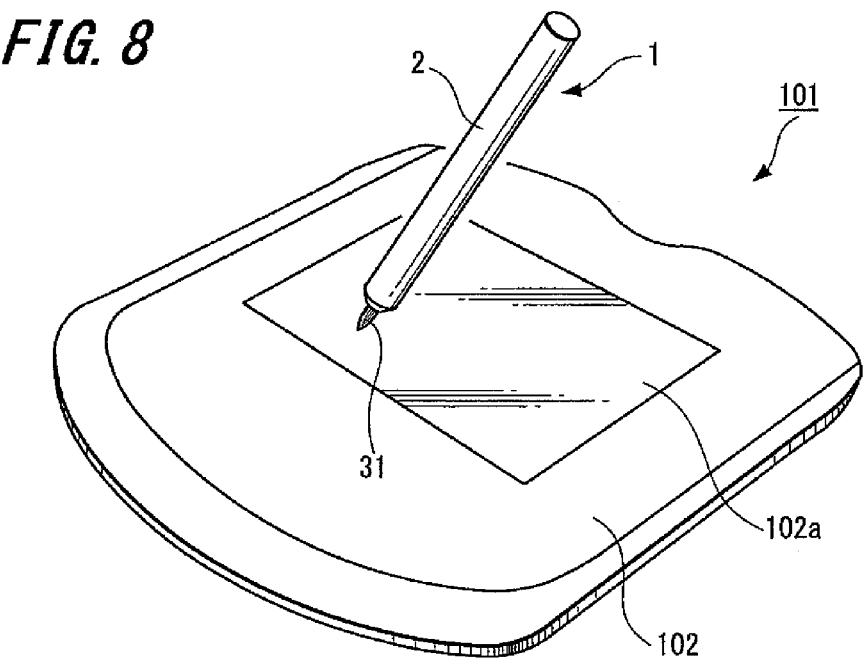
FIG. 8 is a perspective view illustrating a coordinate input device according to an embodiment of the present invention.

FIG. 8 is a coordinate input device 101 with the position indicator 1. The coordinate input device 101 may also be used with the other position indicators 8 and 9 described above.

Figure 9:
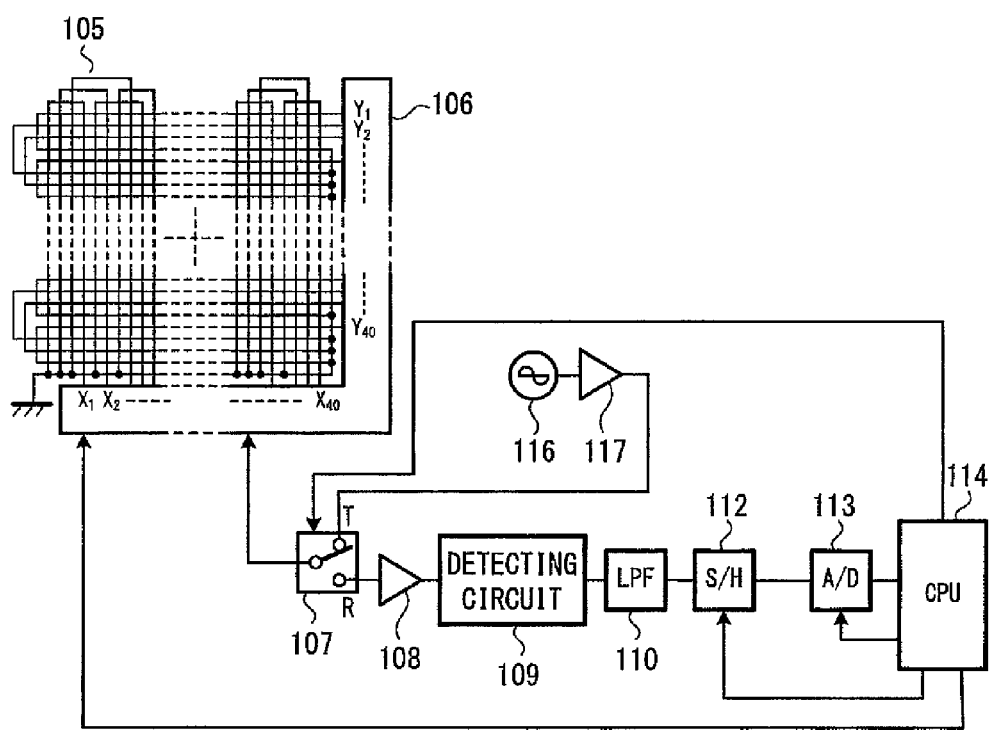
FIG. 9 is a block diagram illustrating the position detector of FIG. 8.

FIG. 9 is a block diagram illustrating a position detector 102 utilized with the position indicator 1 shown in FIG. 8.

As best shown in FIG. 8, the coordinate input device 101 includes the position detector 102 having the input plane 102a, and the position indicator 1 indicating a position on the input plane 102a of the position detector 102. The coordinate input device 101 is utilized as an input device for an external apparatus such as a personal computer or a personal digital assistant (not shown) by connecting the position detector 102 to the external device.

The position detector 102 of the coordinate input device 101 has a flat-plate with an approximately quadrilateral shape, one surface of which is utilized as the input plane 102a, and the other surface of which is utilized as a mounting plane. An electromagnetic induction type of a position detecting unit 105 is provided for the input plane 102a of the position detector 102, as best shown in FIG. 9.

The position detecting unit 105 of the position detector 102 includes 40 loop coils $X_1$ to $X_{40}$ arranged in an X-axis direction, and 40 loop coils $Y_1$ to $Y_{40}$ arranged in a Y-axis direction. The 40 loop coils $X_1$ to $X_{40}$ and 40 loop coils $Y_1$ to $Y_{40}$ are each connected to a selecting circuit 106 selecting each of the loop coils.

The selecting circuit 106 is connected to a duplexing circuit 107, and an amplifier 108 is connected to the receiving side of the duplexing circuit 107. The amplifier 108 is connected to a detecting circuit 109, which is connected to a sample-and-hold circuit 112 via a lowpass filter (LPF) 110. The sample-and-hold circuit 112 is further connected to an analog-to-digital converting circuit (AD converter) 113, to which a CPU (Central Processing Unit) 114 is connected. The CPU 114 supplies control signals to the selecting circuit 106, the sample-and-hold circuit 112, the analog-to-digital converting circuit 113, and the duplexing circuit 107.

The position detector 102 includes an oscillator 116 generating an alternating current signal with a frequency of f0, and a current driver 117 converting the alternating current signal into current. The current driver 117 is connected to a transmitting side of the duplexing circuit 107. Specifically, when a control signal supplied from the CPU 114 switches a contact point to the transmitting side of the duplexing circuit 107, the alternating current signal with a frequency of f0 is output from the loop coils $X_1$ to $X_{40}$ and loop coils $Y_1$ to $Y_{40}$ of the position detecting unit 105.

When the position indicator 1 approaches the position detecting unit 105, the position indicator 1 resonates the internal resonant circuit 41 to output a resonant signal, i.e., a position indicating signal, to the position detecting unit 105. The position detecting unit 105 detects the position indicated by the position indicator 1 as an X-Y coordinate from the selectable positions of the loop coils $X_1$ to $X_{40}$, $Y_1$ to $Y_{40}$ based on the resonant signal supplied from the resonant circuit 41 of the position indicator 1.

The number of magnetic field lines extending from the coil 26 in the position indicator 1 toward the position detecting unit 105 in the inclination direction of the position indicator 1 is greater than the number of magnetic field lines extending from the coil 26 of the position indicator 1 toward the position detecting unit 105 in the opposite direction from the inclination direction of the position indicator 1. Based on the strength and orientation of magnetic field lines provided by the coil 26, the position detecting unit 105 can detect the position indicated by the position indicator 1, and can also detect the inclination of the position indicator 1 with respect to the input plane 102a of the position detector 102.

The CPU 114 of the position detector 102 can determine the inclination of the position indicator 1 detected by the position detecting unit 105 and the pen-pressure applied to the position indicator 1 based on the pen-pressure information supplied from the position indicator 1 via the position detecting unit 105. Subsequently, the CPU 114 performs a control operation based on the determined pen-pressure. For example, the CPU 114 controls a change in gradation of input lines according to the pen-pressure applied thereto. The CPU 114 can also perform control operations based on the pen-pressure that is supplied from the position indicator 1 as pen-pressure information.

The position indicator and coordinate input device according to embodiments of the invention include a guiding unit that guides the movement of a core when external force is applied to an indicating unit in a lateral direction with respect to a central axis extending along a length of the core. Therefore, the core can reliably be moved even though the external force is applied to the indicating unit in the lateral direction with respect to the central axes. As a result, a pressure detector pressed by the core that has been moved can detect the external force as the pen-pressure with high accuracy.

Further, an inclined plane of the guiding unit is formed such that the angle of inclination with respect to the central axis of the core is approximately 30 to 60 degrees. The component of force in the direction along which the core is moved by the external force can efficiently be obtained when the external force is applied in the lateral direction. Thus, the external force is sensitively detected even though the external force is applied in the lateral direction.

Moreover, engaging units of the guiding unit include three or more convex units that are in point contact with the inclined plane thereof. The engaging units may be formed of spherical or rotational members rotationally supported on the case or the core. Due to the structure and operation of the engaging units, the frictional resistance between the inclined plane and the engaging units is minimized. As a result, the amount of the component of force F2 lost due to frictional resistance in the direction in which the core is moved diagonally by the external force is minimized. Thus, the external force can be precisely detected even though the external force is applied in the lateral direction.

The inclined plane and engaging units of the guiding unit may be made of a fluorine resin or polyacetal resin. Additionally, the inclined plane and engaging units may be smoothly finished, e.g., by mirror finishing, thereby minimizing the frictional resistance between the inclined plane and engaging units thereof and minimizing the amount of the component of force F2 lost due to frictional resistance in the direction in which the core is moved by the external force. Thus, the external force is precisely detected even though the external force is applied in the lateral direction.

Since the indicating unit of the core can be formed of a brush or a resilient member in the shape of a calligraphy-brush, the user can input characters or graphics while experiencing a feeling similar to writing with a calligraphy-brush.

The coordinate input device according to various embodiments of the invention includes a detector detecting the inclination of a position indicator with respect to an input plane of the coordinate input device, and a control unit determining the pen-pressure based on the detected inclination and pressure information supplied from the position indicator. Thus, if two different forces are applied to the core in different directions, e.g., by writing with the position indicator at different inclination angles, components of these forces that extend along the central axis of the core may still be made equal. When these components are equal, the magnitude of the pen-pressure is the same. Thus, a user can use the position indicator at a variety of different angles, yet apply the same amount of pen pressure.

It should be understood that the invention is not limited to the aforementioned embodiments and the accompanied drawings, and various modifications and alterations may be made without departing from the scope of the invention. In the aforementioned embodiment, the examples of the position indicator and coordinate input device to both of which the electromagnetic inductive system is applied have been described; however, other coordinate detecting systems such as an electrostatic coupling system and pressure sensitive system and laser system may also be applied to the position indicator and coordinate input device.

Although embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A position indicator comprising:
   an external case;
   a core having an indicating unit projecting outside of the case, the core being movably supported by the case, and the core having a central axis extending along a lengthwise direction thereof;
   a guiding unit including an inclined plane provided on one of the case and the core and an engaging unit provided on the other one of the case and the core, the engaging unit slidably engaged with the inclined plane such that the guiding unit guides movement of the core into said case and along said central axis when external force is applied to the indicating unit of the core in a lateral direction with respect to the central axis of the core; and
   a pressure detector operably associated with the core, the pressure detector detecting pressure applied to the indicating unit in a direction parallel to said central axis based on movement of the core with respect to the case via the guiding unit.

2. A position indicator according to claim 1, wherein the inclined plane is oriented at an angle in the range of 30 to 60 degrees from the central axis of the core.

3. A position indicator according to claim 1, wherein the inclined plane comprises one of a conical plane and a pyramidal plane.

4. A position indicator according to claim 1, wherein the engaging unit comprises an engaging inclined plane extending parallel to the inclined plane.

5. A position indicator according to claim 1, wherein the engaging unit includes at least three projections, each projection in point contact with the inclined plane.

6. A position indicator according to claim 5, wherein the projections each comprise a spherical projection in point contact with the inclined plane.

7. A position indicator according to claim 1, wherein the engaging unit comprises a spherical or cylindrical rotator rotatably supported by the case or the core.

8. A position indicator according to claim 1, wherein at least one of the inclined plane and the engaging unit is mirror-finished.

9. A position indicator according to claim 1, wherein at least one of the inclined plane and the engaging unit is made of a fluorine resin or a polyacetal resin.

10. A position indicator according to claim 1, wherein the indicating unit of the core comprises a brush or an elastic member in a shape of a calligraphy-brush.

11. A coordinate input device, comprising:
    a position detector having an input plane; and
    a position indicator for indicating a position on the input plane and for detecting a force with which the position indicator presses against a surface, the position indicator including an external casing, a core having an indicating unit projecting outside of the casing and being movably supported by the casing, the core having a central axis extending along a lengthwise direction thereof, a guiding unit including an inclined plane provided on one of the casing and the core, and an engaging unit provided on the other one of the casing and the core, the engaging unit slidably engaged with the inclined plane such that the guiding unit guides movement of the core into said case and along said central axis when external force is applied to the indicating unit of the core in a lateral direction with respect to the central axis of the core, and a pressure detector operably associated with the core, the pressure detector detecting pressure applied to the indicating unit along said central axis based on the movement of the core with respect to the case via the guiding unit.

12. A coordinate input device according to claim 11, wherein the position detector includes a detecting unit detecting an inclination of the position indicator with respect to the input plane, and a control unit determining pen-pressure based on the detected inclination of the position indicator and pressure information supplied by the position indicator.

13. A position indicator usable with a coordinate input device, the indicator comprising:
    a housing having an inner surface defining an elongated cavity with at least one opening, said housing having a first central axis extending along said elongated cavity in a lengthwise direction;
    a core movably disposed in the elongated cavity, said core having a first end positioned adjacent said at least one opening, a second end opposite said first end, and a second central axis extending along a lengthwise direction thereof;
    an indicating unit extending from said first end of said core via said at least one opening in said housing;
    a guiding unit disposed between said inner surface of said housing and said core, said guiding unit guiding movement of said core by translating a force applied to said indicating unit in a lateral direction with respect to the first central axis into axial movement into said housing and along the second central axis of said core;
    a pressure sensor disposed in said elongated cavity, said pressure sensor being engaged by said second end of said core and for detecting pressure applied to said indicating unit based on the axial movement of the core.

14. The position indicator of claim 13, wherein the second central axis of the core remains substantially parallel to the first central axis of the housing when the lateral force is applied to the indicating unit.

15. The position indicator of claim 13, wherein said guiding unit guides the core diagonally with respect to said first central axis such that the second central axis of the core is moved away from the first central axis of the housing in response to the lateral force applied to said indicating unit.

16. The position indicator of claim 15, wherein said guiding unit maintains the first and second central axes in parallel with one another.

17. The position indicator of claim 13, wherein a width dimension of said elongated cavity gradually becomes smaller closer to said at least one opening, and said guiding unit comprises:
    a first inclined plane disposed along said inner surface of said case beginning at said at least one opening, said first inclined plane being inclined with respect to the first central axis of said housing; and
    a second inclined plane disposed along an outer surface of said core opposite from said first inclined plane, said first and second inclined planes slidably engaging each other to move the second central axis of the core laterally toward the first central axis of the housing when no lateral force is applied to said indicating unit such that the core is allowed to move outwardly toward the at least one opening in the elongated cavity and away from the pressure sensor, and to move the second central axis of the core laterally away from the first central axis of the housing when the core is moved laterally inwardly in the elongated cavity and toward the pressure sensor in response to the lateral force applied to said indicating unit.

18. The position indicator of claim 13, wherein the guiding unit comprises:
   an inclined plane disposed along said inner surface of said housing adjacent to said at least one opening, said inclined plane being inclined with respect to the first central axis of said housing; and
   a plurality of rotational projections disposed around the core, said rotational projections engaging said inclined plane to move the core along the direction of said inclined plane when said lateral force is applied to said indicating unit.

19. The position indicator of claim 13, further comprising:
   a coil wound around the core, said coil transmitting electromagnetic waves to the coordinate input device, the electromagnetic waves including information about the amount of pressure sensed by the pressure sensor, information about a position of the position indicator with respect to the coordinate input device, and information about an angle of inclination of the position indicator with respect to an input plane of the coordinate input device.

20. A coordinate input device, comprising:
   a position detector including:
      an input plane, and
      a position detecting unit having a plurality of sensing elements arranged in proximity with said input plane; and
   a position indicator for indicating a position on said input plane, said position indicator including:
      a housing having a first central axis extending along said elongated cavity in a lengthwise direction,
      a pressure detector disposed in said housing,
      a core movably disposed in said housing, said core having an indicating unit disposed at a first end thereof and a pressing unit disposed at a second end thereof, said pressing unit for engaging said pressure detector so that said pressure detector detects the amount of pressure on said indicating unit along said first central axis;
      a guiding unit for guiding diagonal movement of said core parallel to said first central axis and into said housing when lateral force is applied to said indicating unit, and said guiding unit maintains a central axis of the core substantially parallel to a central axis of the housing when the lateral force is applied to the indicating unit; and
      a coil wound about said core, said coil being operable by said pressure detector for transmitting information to said position detector, said transmission information including information about the amount of pressure on said indicating unit, information about a position of said position indicator with respect to said input plane, and information about an angle of inclination of said position indicator with respect to said input plane.

21. A method of indicating a position on a coordinate input device, the method comprising:
   providing a position indicator having a housing having a first central axis extending along said elongated cavity in a lengthwise direction, a core movably disposed within the housing, an indicating unit extending from the core outside the housing, and a pressure detector for detecting pressure applied to the indicating unit based on relative movement of the core with respect to the housing, the core having a central axis, and a guiding unit having an inclined plane disposed on one of the housing and the core and an engaging unit disposed on the other one of the housing and the core, the inclined plane being inclined with respect to the central axis of the core;
   applying an external force to the indicating unit in a lateral direction with respect to the central axis of the core, the external force displacing the core relative to the housing;
   guiding the displacement of the core diagonally with respect to said first central axis based on the interaction between the inclined plane and the engaging unit of the guiding unit in response to the external force so that the core moves toward said pressure detector in a direction parallel to said first central axis; and
   detecting pressure on the indicating unit based on the relative displacement between the core and the housing in a direction parallel to said first central axis using the pressure detector.

* * * * *